(12) United States Patent
Boecker et al.

(10) Patent No.: US 7,873,966 B2
(45) Date of Patent: Jan. 18, 2011

(54) METHOD AND APPARATUS FOR TRANSFERRING DATA TO VIRTUAL DEVICES BEHIND A BUS EXPANDER

(75) Inventors: Douglas Michael Boecker, Rochester, MN (US); Stephan Otis Broyles, Austin, TX (US); Scott Allen Liebl, Oronoco, MN (US); Hemlata Nellimarla, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 11/965,814

(22) Filed: Dec. 28, 2007

(65) Prior Publication Data

US 2008/0104295 A1   May 1, 2008

Related U.S. Application Data

(63) Continuation of application No. 10/425,440, filed on Apr. 28, 2003, now Pat. No. 7,334,234.

(51) Int. Cl.
G06F 13/00 (2006.01)
G06F 13/10 (2006.01)
G06F 13/14 (2006.01)
G06F 13/36 (2006.01)

(52) U.S. Cl. .................. 719/321; 719/324; 710/305; 710/306

(58) Field of Classification Search .................. None
See application file for complete search history.

(56) References Cited

U.S. PATENT DOCUMENTS

| | | | |
|---|---|---|---|
| 5,619,685 A | 4/1997 | Schiavone |
| 6,145,036 A | 11/2000 | Barenys et al. |
| 6,233,635 B1 | 5/2001 | Son |
| 6,338,150 B1 | 1/2002 | Johnson et al. |
| 6,449,289 B1 | 9/2002 | Quicksall |
| 6,510,484 B1 | 1/2003 | Kim et al. |
| 6,516,367 B1 | 2/2003 | Barenys et al. |
| 6,622,188 B1 | 9/2003 | Goodwin et al. |
| 6,728,908 B1 | 4/2004 | Fukuhara et al. |
| 6,785,894 B1 | 8/2004 | Ruberg |
| 6,810,461 B2 | 10/2004 | Okazawa et al. |
| 6,907,478 B2 | 6/2005 | Li et al. |
| 6,925,349 B2 | 8/2005 | Albrecht et al. |
| 7,127,541 B2 | 10/2006 | Govindarajulu et al. |
| 2004/0059852 A1 | 3/2004 | Sun et al. |
| 2004/0177194 A1 | 9/2004 | Benson et al. |
| 2004/0216142 A1 | 10/2004 | Arnez et al. |

*Primary Examiner*—Li B Zhen
(74) *Attorney, Agent, or Firm*—Yee & Associates, P.C.; Diana R. Gerhardt

(57) ABSTRACT

A method, apparatus, and computer instructions for transferring data from a master to a set of applications executing on a slave. Data is received from a master at a device driver in the slave. The data is parsed for an identifier by a virtual hub in the slave, wherein the identifier is associated with the data by the master. The data is sent to an application within the set of applications based on the identifier.

5 Claims, 3 Drawing Sheets

METHOD AND APPARATUS FOR TRANSFERRING DATA TO VIRTUAL DEVICES BEHIND A BUS EXPANDER

CROSS REFERENCE TO RELATED APPLICATION

The present invention is related to the following application entitled "Method and Apparatus for Multiple Slaves to Receive Data From Multiple Masters in a Data Processing System", Ser. No. 10/425,396, filed Apr. 28, 2003, assigned to the same assignee, and incorporated herein by reference.

This application is a continuation of application Ser. No. 10/425,440, filed Apr. 28, 2003, now U.S. Pat. No. 7,334,234.

BACKGROUND OF THE INVENTION

1. Technical Field

The present invention relates generally to an improved data processing system and in particular to a method and apparatus for processing data. Still more particularly, the present invention provides a method and apparatus for transferring data on a bus between master and slave components.

2. Description of Related Art

A bus is a common pathway, or channel, between multiple devices. The computer's internal bus is known as the local bus, or processor bus. This type of bus provides a parallel data transfer path between the CPU and main memory and to the peripheral buses. A 16-bit bus transfers two bytes at a time over 16 wires; a 32-bit bus uses 32 wires, etc. The bus is comprised of two parts; the address bus and the data bus. Addresses are sent over the address bus to signal a memory location, and the data is transferred over the data bus to that location.

Various other types of buses are used in data processing systems. In particular, an inter internal control (IIC) bus is an example of another type of bus used in a data processing system. An IICU bus, also referred to as an $I^2C$ bus, was developed by Koninklijke Philips Electronics NV, also known as Philips Semiconductors. Details and specifications on the protocols for this bus are found in The $I^2C$-Bus Specification, Version 2.1, January 2000. In this bus, one wire carries a clock signal, while another wire carries the data signal. This type of bus is used to provide interconnection between various devices, such as a flexible service processor, a memory, and a control panel. A flexible service processor is a processing unit that is used to initialize a data processing system. A flexible service processor has its own boot code and operating system and may be connected to a number of I/O devices.

Devices connected to an IIC bus may operate in a master or slave mode. In a master read/write mode, the device may initiate a data transfer. When a device is in a slave read/write mode, the device simply waits for data coming over the IIC bus. On a flexible service processor, a device driver is employed by the flexible service processor to handle data transfers with the bus. An application executing on a flexible service processor may make a call to the device driver indicating that the flexible service processor needs to respond as a slave to some event triggered by an external master. An external master is a master device located external to the flexible service processor. An example of an external master device is a control panel, which may send identifying button pushes on the panel, to the flexible service processor. Another example of an external master device is a rack power controller, which may send data, such as power transition or heartbeat command data to the flexible service processor.

More than one master, external to the flexible service processor, may target a "slave" in the flexible service processor. With this situation, more than one event may be issued by different external devices at the same time. Further, more than one process or application executing on the flexible service processor may be waiting for data on the same bus. When a flexible service processor operates as a slave device, it is only able to listen for data on a single slave address for a particular TIC bus. IIC buses have no intelligence regarding the identity of the master triggering the event. As a result, the bus is unable to associate data, put on data lines, with the process waiting for the data.

With this set-up, only one slave transfer request is currently possible for a device driver on a flexible service processor. If data for events are issued by different master devices, data can be lost if the flexible service processor is not continuously set up to receive any data that might be put onto the bus. For example, two applications may be executing on a flexible service processor in which one application monitors for button pushes on a control panel, while the other application monitors for temperature data from a power device, such as a rack power controller. If both the control panel and the rack power controller send data, as master devices, on the bus at the same time, the data is directed towards the flexible service processor as the slave device. This data can be received by only one of the applications because the current architecture only allows the device driver for the flexible service processor to handle only one slave request at a time. In this example, both applications cannot issue slave requests that can be handled by the device driver. As a result, a loss of information may occur.

Therefore, it would be advantageous to have an improved method, apparatus, and computer instructions for handling data transfers between external master devices and internal requests for slave transfers.

SUMMARY OF THE INVENTION

The present invention provides a method, apparatus, and computer instructions for transferring data from a master to a set of applications executing on a slave. Data is received from a master at a device driver in the slave. The data is parsed for an identifier by a virtual hub in the slave, wherein the identifier is associated with the data by the master. The data is sent to an application within the set of applications based on the identifier.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
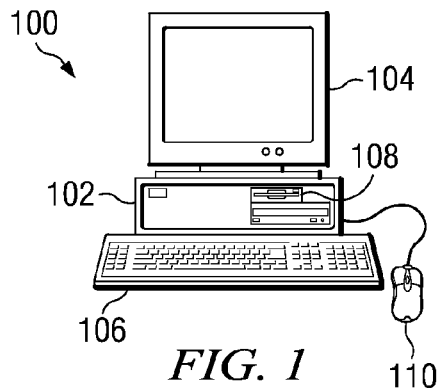
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
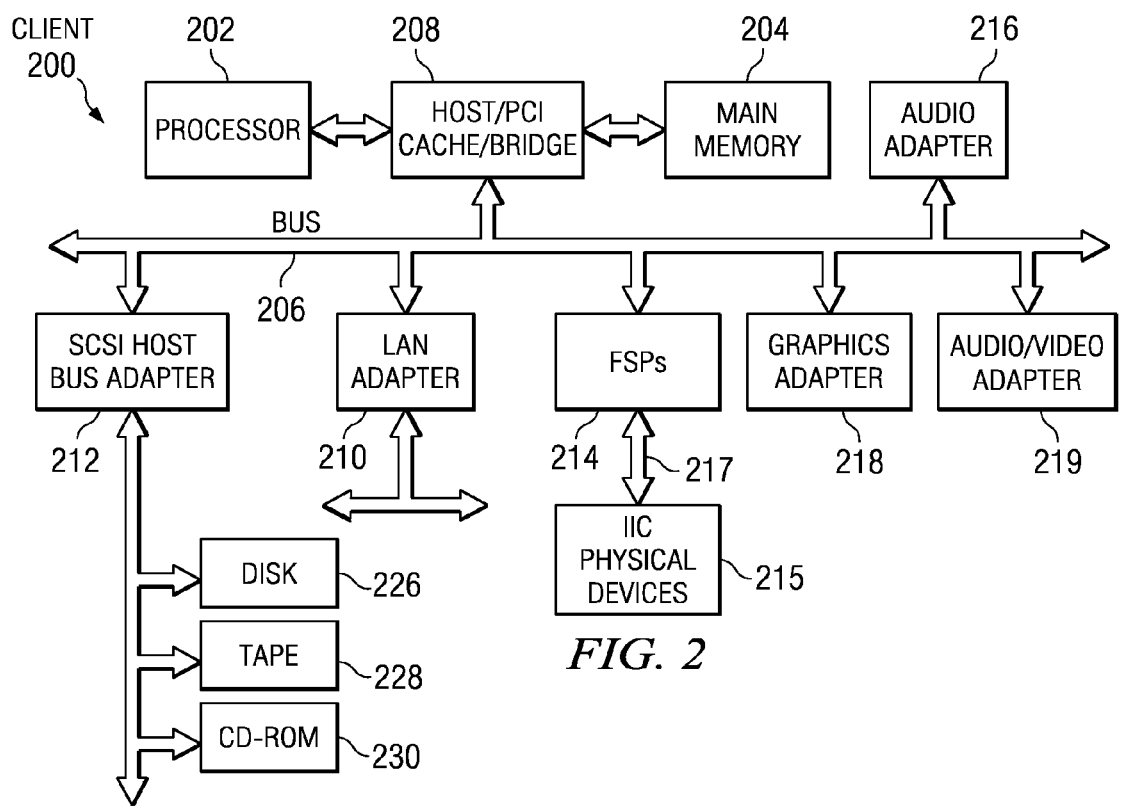
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212 and flexible service processors 214 are connected to PCI local bus 206 by direct component connection. In contrast, audio adapter 216, graphics adapter 218, and audio/video adapter 219 are connected to PCI local bus 206 by add-in boards inserted into expansion slots.

Flexible service processors 214 provide PCI and IIC bus connections. In this example, flexible service processors 214 are connected to inter internal control physical devices 215 by IIC bus 217. Inter internal control physical devices 214 includes components, such as a control panel, a flexible service processor, a power device, and a memory.

SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. Instructions for the operating system and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Figure 3:
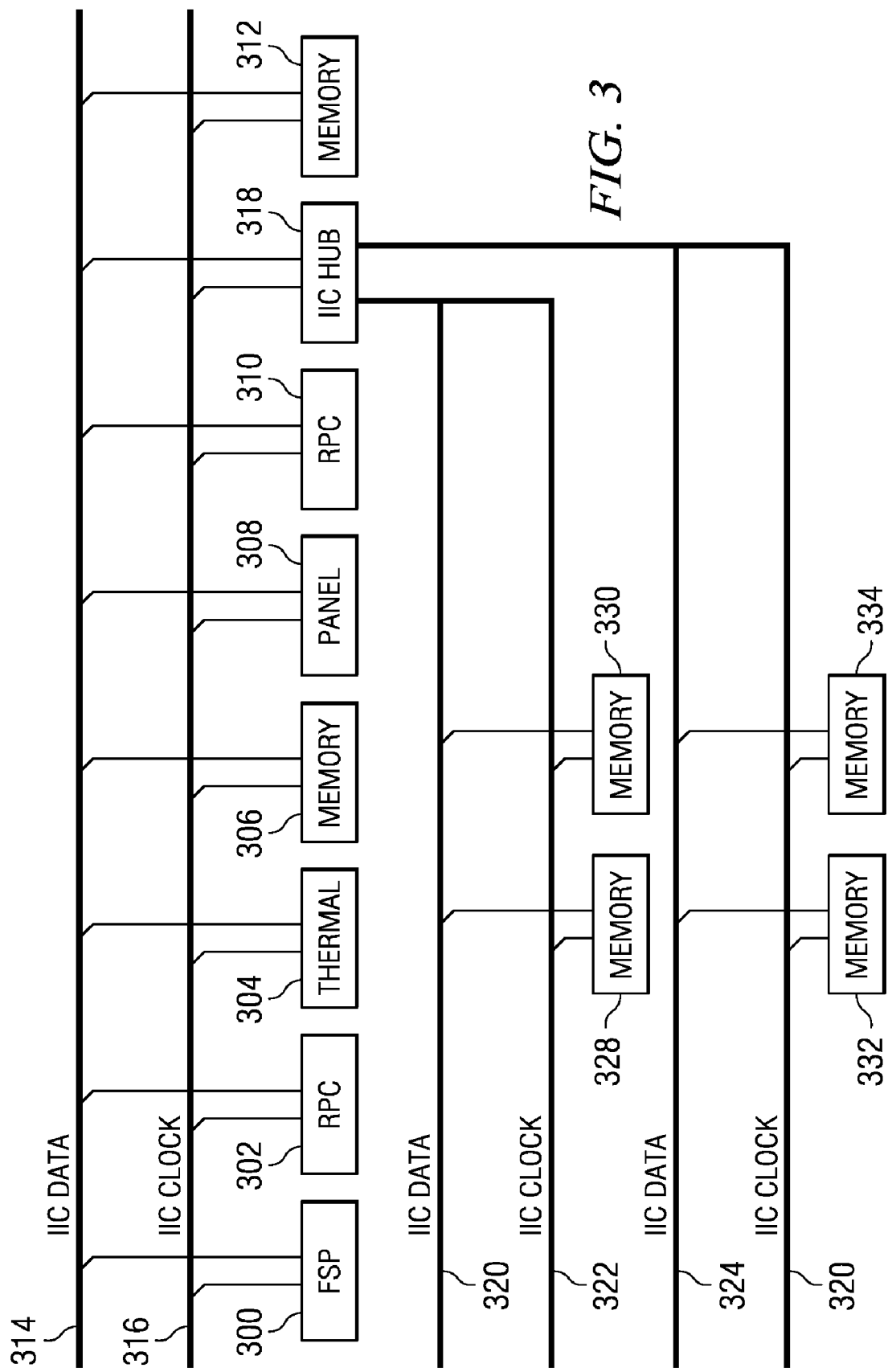
FIG. 3 is a diagram illustrating physical devices used in transferring data in accordance with a preferred embodiment of the present invention.

Turning next to FIG. 3, a diagram illustrating physical devices used in transferring data is depicted in accordance with a preferred embodiment of the present invention. The physical devices illustrated in FIG. 3 are similar to IIC physical devices 214 in FIG. 2.

In this example, flexible service processor (FSP) 300, rack power controller (RFP) 302, thermal unit 304, memory 306, panel 308, rack power controller 310, and memory 312 are connected to a primary IIC bus, which is formed by data line 314 and clock line 316. IIC hub 318 is also connected to data line 314 and clock line 316. This hub provides an interconnection for two additional IIC buses formed by data line 320, clock line 322, data line 324, and clock line 326 in this example. Memory 328 and memory 330 are connected to data line 320 and clock line 322. Memory 332 and memory 334 are connected to data line 324 and clock line 326.

As illustrated, flexible service processor 300 is a physical device that executes an operating system and is initialized prior to initializing the rest of the data processing system. Flexible service processor 300 includes components, such as nonvolatile memory, dynamic random access memory, a flash memory, and a controller to control various I/O devices. Rack power controller 302 and 310 are physical devices that provide control functions for power to a data processing system. Thermal unit 304 is a physical device providing temperature data. Panel 308 is a physical device, such as a panel with a power or reset button. Memory 306, memory 312, memory 328, memory 330, memory 332, and memory 334 are used to store data.

In this example, flexible service processor 300 acts as either a slave or master device in which a number of applications may execute. Panel 308, rack power controller 302, and rack power controller 310 may act as either slave or master devices. The memories illustrated are normally slave devices as well as thermal unit 304. ICC hub 318 is a master only for the sub-buses formed by data line 320, clock line 322, data line 324, and clock line 326. This hub is a slave on the primary bus formed by data line 314 and clock line 316.

The protocol for IIC buses supports I/O reads and writes in two different modes. One mode involves an I/O operation issued by a master, which is referred to as a master read/write. A second mode for I/O operations is a slave read/write, which is triggered by devices external to the system in consideration. In this example, the system in consideration may be flexible service processor 300, with external devices, such as rack power controller 302 and panel 308 triggering the slave I/O operations.

Flexible service processor 300 is an embedded system, which includes applications having responsibility for physical devices attached to the IIC buses. Such a function requires flexible service processor 300 to operate as a slave.

Figure 4:
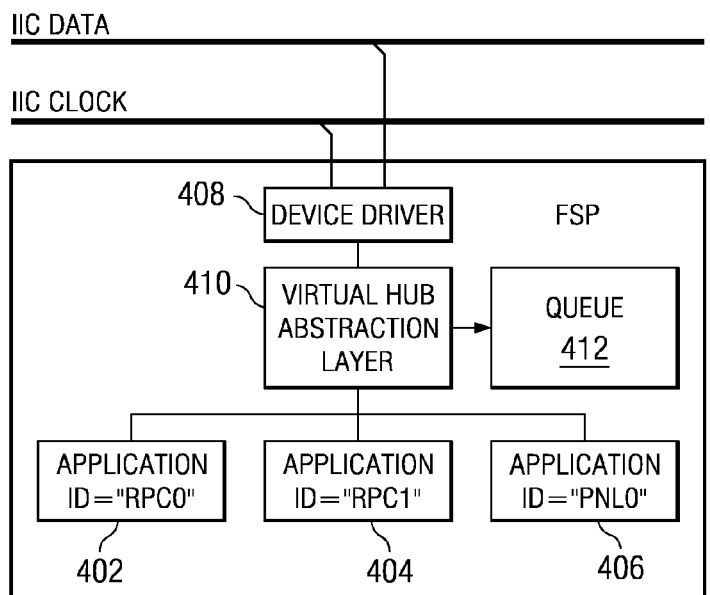
FIG. 4 is a diagram illustrating components in a flexible service processor in accordance with a preferred embodiment of the present invention.

Turning now to FIG. 4, a diagram illustrating components in a flexible service processor is depicted in accordance with a preferred embodiment of the present invention. Flexible service processor 400 is an example of a flexible service processor, such as flexible service processor 300 in FIG. 3. In this example, application 402, application 404, and application 406 are applications that own or are responsible for external devices on an IIC bus.

In these examples, device driver 408 follows a standard IIC protocol. Device driver 408 provides access to the IIC bus. This device driver allows only one application to act as a virtual device within flexible service processor 400. In other words, only one slave is supported by device driver 408 because a physical device supports only a single slave address on the bus. Thus, all of these applications are unable to request slave read operations or slave write operations from device driver 408 at the same time.

The mechanism of the present invention includes the use of an intelligent routing mechanism, such as virtual hub abstraction layer 410. This hub acts as a virtual expander to overcome the hardware addressing restriction limiting the number of virtual devices. Through virtual hub abstraction layer 410, application 402, application 404, and application 406 may all generate concurrent requests for slave I/O operations. Virtual hub abstraction layer 410 registers the applications when requests are made for I/O operations. These requests are registered in queue 412.

In these examples, the requests include an application ID for each application. For example, application 402 has an application ID of RPC0, application 404 has an application ID of RPC1, and application 406 has an application ID of PNL0. These application IDs correspond to physical devices on the IIC bus for which these applications own or manage. Application 402 owns rack power controller 302 in FIG. 3, application 404 owns rack power controller 310, and application 406 owns panel 308.

Virtual hub abstraction layer 410 acts as a virtual device with respect to device driver 408. By registering the virtual devices, such as the applications, multiple virtual devices may connect to one single physical bus with these devices all having pending virtual reads. When data is received by device driver 408, this data is passed to virtual hub abstraction layer 410. This hub identifies the appropriate application to which the data is to be directed based on an application identifier in the data. When the appropriate application is identified, that data is directed to the application by virtual hub abstraction layer 410. At that point, the application will handle bus communication directed towards it by the external master device.

For example, in a communication between panel 308 in FIG. 3 and application 408 in FIG. 4, panel 308 acts as a master on the bus and sends a command to flexible service processor 400 as a slave. The command is sent to flexible service processor 400 using the physical address of this device. This command includes a data header containing an application ID, PNL0, and data. All of this information is received by device driver 408. Virtual hub abstraction layer 410 parses the data to locate the application ID in the data header. The application ID is used to locate the application registered in queue 412. In this example, the application is identified as application 406. Thereafter, the data is sent to the application 406, which processes the message sent by panel 308.

In another example, rack power controller 302 in FIG. 3 may send commands to application 402 in FIG. 4. As in the previous example, the data is sent to a physical target, flexible service processor 400, using its physical address. This data includes a data header containing an application ID, RPC0, and data. Device driver 408 receives this data and passes it to virtual hub abstraction layer 410. This hub parses the data to locate the application ID. This application ID is used to identify the appropriate application registered in queue 412. In this case, the application is application 402. Once the application is located, the data is then sent to the application for processing.

In these examples, both application 402 and application 406 have pending slave operations registered with virtual hub abstract layer 410 in queue 412. This hub allows for multiple virtual devices to have pending slave I/O requests even though only a single virtual device is supported through device driver 408. These examples only require the master devices to include the appropriate application ID. In these examples, application IDs are defined when architectural internal protocols are put together between the master devices on the IIC bus. Of course, depending on the particular implementation, these IDs could be defined using other mechanisms. For example, the application IDs could be assigned by virtual hub abstract layer 410 or by firmware during initialization.

Figure 5:
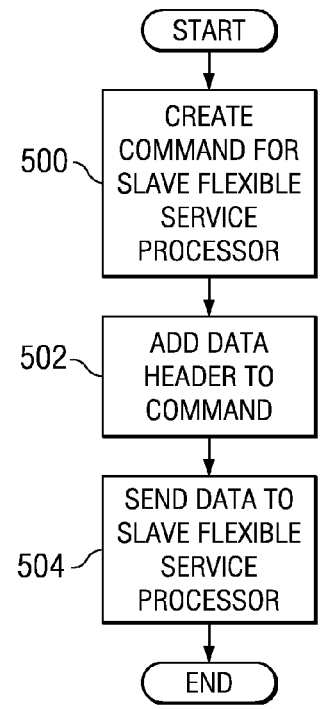
FIG. 5 is a flowchart of a process for sending a command to a virtual slave device in accordance with a preferred embodiment of the present invention.

Turning next to FIG. 5, a flowchart of a process for sending a command to a virtual slave device is depicted in accordance with a preferred embodiment of the present invention. The process illustrated in FIG. 5 may be implemented in a master device, such as panel 308 in FIG. 3.

The process begins by creating a command for a slave flexible service processor (step 500). Thereafter, a data header is added to the command (step 502). In this example, the data header includes an application ID that is used to identify the application that owns or manages the master device. The data is then sent to the slave flexible service processor (step 504), with the process terminating thereafter.

Figure 6:
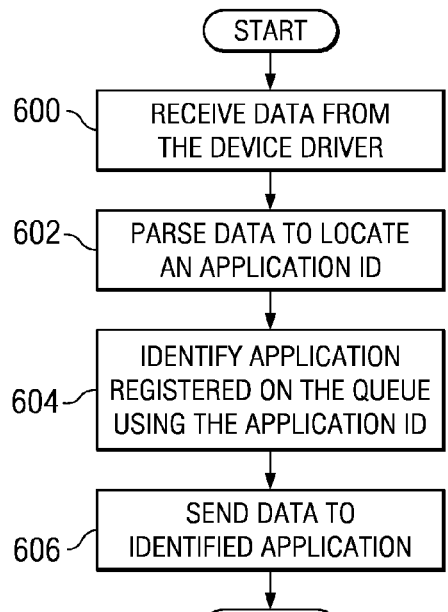
FIG. 6 is a flowchart of a process for routing data to virtual devices in accordance with a preferred embodiment of the present invention.

Turning now to FIG. 6, a flowchart of a process for routing data to virtual devices is depicted in accordance with a preferred embodiment of the present invention. The process illustrated in FIG. 6 may be implemented in a hub, such as virtual hub abstract layer 410 in FIG. 4.

The process begins by receiving data from the device driver (step 600). Thereafter, the data is parsed to locate an application ID (step 602). This application ID is used to identify an application registered on the queue (step 604). The data is then sent to the identified application (step 606), with the process terminating thereafter.

Figure 7:
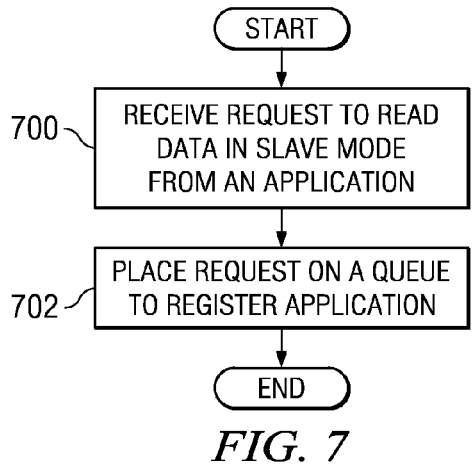
FIG. 7 is a flowchart of a process used to register a virtual device in accordance with a preferred embodiment of the present invention.

With reference now to FIG. 7, a flowchart of a process used to register a virtual device is depicted in accordance with a preferred embodiment of the present invention.

The process begins by receiving a request to read data in a slave mode from an application (step 700). The request is then placed on a queue to register the application (step 702), with the process terminating thereafter.

Thus, the present invention provides a method, apparatus, and computer instructions for allowing multiple virtual devices to connect to a virtual hub even though only a single physical device is normally supported due to addressing limitations. A virtual hub abstract layer allows for many virtual slave devices to request slave operations on a bus even though the hardware only supports a single slave. This mechanism also insures that data is not lost on the physical bus due to application processing delays. Further, the identity of the master is not required for appropriate routing of the data.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product in a data processing system that includes a slave device that includes a single device driver, the slave device coupled to a plurality of physical master devices, the computer program product comprising:

a computer recordable-type medium storing computer usable program code for transferring data from the slave device to a plurality of applications that are executing on the slave device, said computer program product including:

said device driver permitting only one virtual device at a time, said device driver including a routing mechanism that acts as said virtual device with respect to said device driver;

computer usable program code for managing, by each one of a plurality of applications, one of said plurality of physical master devices;

computer usable program code for receiving, from each one of said plurality of applications by said routing mechanism, a request that was generated by each one of said plurality of applications for a slave I/O operation, all of said plurality of applications having concurrently pending requests;

computer usable program code for registering, by said routing mechanism, each one of said plurality of applications in a queue when each one of said plurality of applications makes a request for a slave I/O operation;

each one of said plurality of applications having an application identifier that corresponds to one of said plurality of physical master devices that is managed by said one of said plurality of applications;

computer usable program code for receiving first data, from a first one of said plurality of physical master devices by said device driver, said first one of said plurality of physical master devices associating a first application identifier with said first data, said first application identifier identifying a first one of said plurality of applications that manages said first one of said plurality of physical master devices;

computer usable program code for passing, by said device driver, said first data to said routing mechanism;

computer usable program code for parsing, by said routing mechanism, said first data for said first application identifier;

computer usable program code for using, by said routing mechanism, said first application identifier to locate said first one of said plurality of applications in said queue; and computer usable program code for sending, by said routing mechanism, said first data to said first one of said plurality of applications.

2. The computer program product of claim 1, further comprising:

the slave device being a physical device that has a single slave address; and computer usable program code for listening, by the slave device, for data on a physical bus that is addressed to the single slave address, said plurality of physical master devices communicating with the slave device using only the single slave address.

3. The computer program product of claim 1, wherein the plurality of applications are applications that have made a slave read request to the routing mechanism.

4. The computer program product of claim 1, further comprising:

said slave device connected to a physical bus; and said physical bus being an inter internal control bus.

5. The computer program product of claim 1, further comprising:

the device driver and the routing mechanism being computer executable instructions that are located in a flexible service processor.

* * * * *